US008341442B2

(12) United States Patent
Boss et al.

(10) Patent No.: US 8,341,442 B2
(45) Date of Patent: Dec. 25, 2012

(54) ENERGY LOAD MANAGEMENT METHOD AND SYSTEM

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/413,354

(22) Filed: Mar. 6, 2012

(65) Prior Publication Data

US 2012/0166835 A1 Jun. 28, 2012

Related U.S. Application Data

(63) Continuation of application No. 12/391,308, filed on Feb. 24, 2009, now Pat. No. 8,205,106.

(51) Int. Cl.
*G06F 1/26* (2006.01)

(52) U.S. Cl. .......... 713/320; 713/322; 700/295; 307/34; 307/35; 307/39; 307/129

(58) Field of Classification Search .................. 713/320, 713/322; 700/295–297; 307/34, 35, 39, 307/129

See application file for complete search history.

(56) References Cited

U.S. PATENT DOCUMENTS

| | | | | | |
|---|---|---|---|---|---|
| 2,839,692 | A | * | 6/1958 | Kirchmayer | 307/57 |
| 3,486,033 | A | * | 12/1969 | Salo | 307/39 |
| 3,558,911 | A | * | 1/1971 | Chen | 307/129 |
| 3,944,885 | A | * | 3/1976 | Sparling | 361/54 |
| 3,993,984 | A | * | 11/1976 | Penrod | 340/658 |
| 4,317,049 | A | * | 2/1982 | Schweppe | 307/39 |
| 4,319,329 | A | * | 3/1982 | Girgis et al. | 702/75 |
| 4,385,241 | A | * | 5/1983 | Peddie et al. | 307/39 |
| 5,426,620 | A | * | 6/1995 | Budney | 368/10 |
| 5,442,335 | A | * | 8/1995 | Cantin et al. | 340/13.22 |

(Continued)

FOREIGN PATENT DOCUMENTS

CA 2082914 5/1994

(Continued)

OTHER PUBLICATIONS

Shokooh et al. Intelligent Load Shedding Need for a Fast and Optimal Solution. IEEE PCIC Europe. 2005.*

(Continued)

*Primary Examiner* — Matthew D Spittle

(74) *Attorney, Agent, or Firm* — Schmeiser, Olsen & Watts; Anna Linne

(57) ABSTRACT

A modification method and system. The method includes detecting and monitoring by a computing system, a frequency signal associated with an input voltage signal used for powering a plurality of power consumption devices at a specified location. The computing system compares the frequency signal to a predetermined frequency value. The computing system determines that the frequency signal comprises a first value that is not equal to the predetermined frequency value. The computing system calculates a difference value between the first value and the predetermined frequency value. The computing system compares the difference value to a second value. The computing system enables a load adjustment modification process associated with the plurality of power consumption devices. The computing system generates and stores a report associated with the load adjustment modification process.

17 Claims, 3 Drawing Sheets

U.S. PATENT DOCUMENTS

| | | | | |
|---|---|---|---|---|
| 5,687,139 | A * | 11/1997 | Budney | 368/10 |
| 6,314,378 | B1 * | 11/2001 | Hodge et al. | 702/57 |
| 6,671,586 | B2 * | 12/2003 | Davis et al. | 700/295 |
| 6,862,498 | B2 * | 3/2005 | Davis et al. | 700/295 |
| 6,993,683 | B2 * | 1/2006 | Bhat et al. | 714/43 |
| 7,010,363 | B2 * | 3/2006 | Donnelly et al. | 700/19 |
| 7,149,605 | B2 * | 12/2006 | Chassin et al. | 700/295 |
| 7,218,998 | B1 * | 5/2007 | Neale | 700/295 |
| 7,242,114 | B1 * | 7/2007 | Cannon et al. | 307/129 |
| 7,274,975 | B2 | 9/2007 | Miller | |
| 7,355,301 | B2 * | 4/2008 | Ockert et al. | 307/29 |
| 7,356,385 | B2 * | 4/2008 | Lenarduzzi et al. | 700/295 |
| 7,356,422 | B2 * | 4/2008 | Schweitzer, III | 702/60 |
| 7,420,293 | B2 * | 9/2008 | Donnelly et al. | 307/34 |
| 7,595,567 | B1 * | 9/2009 | Cannon et al. | 307/29 |
| 7,783,339 | B2 * | 8/2010 | Lee et al. | 600/509 |
| 8,201,000 | B2 * | 6/2012 | Boss et al. | 713/320 |
| 8,205,106 | B2 * | 6/2012 | Boss et al. | 713/320 |
| 2008/0167756 | A1 | 7/2008 | Golden et al. | |
| 2010/0218006 | A1 | 8/2010 | Boss et al. | |
| 2010/0218027 | A1 | 8/2010 | Boss et al. | |

FOREIGN PATENT DOCUMENTS

| | | |
|---|---|---|
| GB | 2436253 | 9/2007 |

OTHER PUBLICATIONS

Terzija, Vladimir. Adaptive Underfrequency Load Shedding Based on the Magnitude of the Disturbance Estimation. IEEE Transactions on Power Systems. vol. 21. No. 3. Aug. 2006.*

Dong, Mingchui. Adaptive Under-Frequency Load Shedding. Tsinghua Science and Technology. vol. 13, No. 6. Dec. 2008.*

Stefanidou et al. Control Strategies for Under-Frequency Load Shedding. EEH Power Systems Laboratory. Sep. 3, 2009.*

Rune Gustavsson; Agents with Power; Communications of the ACM, Mar. 1999, vol. 42, No. 3; pp. 41-47.

Takemiya et al.; Sustainable Adaptive Grid Supercomputing: Multiscale Simulation of Semiconductor Processing across the Pacific; SC2006 Nov. 2006, Tampa, Florida, USA; 2006 IEEE; 11 pages.

Peng Li; Power Grid Simulation Via Efficient Sampling-Based Sensitivity Analysis and Hierarchical Symbolic Relaxation; DAV 2005, Jun. 13-17, 2005, Anaheim, California, USA; Copyright 2005 ACM; pp. 664-669.

Hanchate et al.; A Game-Theoretic Framework for Multimetric Optimization of Interconnect Delay, Power, and Crosstalk Noise During Wire Sizing; ACM Transactions on Design Automation of Electronic Systems, vol. 11, No. 3, Jul. 2006; pp. 711-739.

Benini et al.; System-Level Power Optimization: Techniques and Tools; ACM Transactions on Design Automation of Electronic Systems, vol. 5, No. 2, Apr. 2000; pp. 115-192.

Terzija, Vladimir V.; Adaptive Underfrequency Load Shedding Based on the Magnitude of the Disturbance Estimation; IEEE Transactions on Power Systems, vol. 21, No. 3, Aug. 2006; pp. 1260-1266.

Stefanidou et al.; Control Strategies for Under-frequency Load Shedding, Interaction of Distributed Generation with Load Shedding, Decentralized Under-Frequency Load Shedding of Household Loads; EEH Power Systems Laboratory, Swiss Federal Institute of Technology (ETH) Zurich; Semester Thesis PSL0904; Sep. 3, 2009; 71 pages.

Shokooh et al.; Intelligent Load Shedding Need for a Fast and Optimal Solution; IEEE PCIC Europe 2005; 10 pages.

Dong et al.; Adaptive Under-Frequency Load Shedding; Tsinghua Science and Technology; ISSN 1007-0214, 14/18, vol. 13, No. 6, Dec. 2008; pp. 823-828.

Office Action (Mail Date Sep. 15, 2011) for U.S. Appl. No. 12/391,308, filed Feb. 24, 2009; Art Unit 2111; Confirmation No. 6793.

Amendment filed Dec. 8, 2011 in response to Office Action (Mail Date Sep. 15, 2011) for U.S. Appl. No. 12/391,308, filed Feb. 24, 2009; Art Unit 2111; Confirmation No. 6793.

Notice of Allowance (Mail Date Feb. 6, 2012) for U.S. Appl. No. 12/391,308, filed Feb. 24, 2009; Art Unit 2111; Confirmation No. 6793.

Office Action (Mail Date Sep. 14, 2011) for U.S. Appl. No. 12/391,390, filed Feb. 24, 2009; Art Unit 2111; Confirmation No. 6928.

Amendment filed Dec. 8, 2011 in response to Office Action (Mail Date Sep. 14, 2011) for U.S. Appl. No. 12/391,390, filed Feb. 24, 2009; Art Unit 2111; Confirmation No. 6928.

Notice of Allowance (Mail Date Feb. 3, 2012) for U.S. Appl. No. 12/391,390, filed Feb. 24, 2009; Art Unit 2111; Confirmation No. 6928.

U.S. Appl. No. 13/413,227, filed Mar. 6, 2012; Art Unit 2628; Confirmation No. 5579.

* cited by examiner

ENERGY LOAD MANAGEMENT METHOD AND SYSTEM

This application is a continuation application claiming priority to Ser. No. 12/391,308, filed Feb. 24, 2009.

FIELD

The present invention relates to a method and associated system for monitoring a frequency signal and performing a load adjustment modification process based on a value of the frequency signal.

BACKGROUND

Monitoring and modifying power systems typically comprises an inaccurate process with little flexibility. Accordingly, there exists a need in the art to overcome at least some of the deficiencies and limitations described herein above.

SUMMARY

The present invention provides a modification method comprising: detecting, by a computing system, a frequency signal associated with an input voltage signal used for powering a plurality of power consumption devices at a specified location; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; enabling, by the computing system based on results of the second comparing, a load adjustment modification process associated with the plurality of power consumption devices at the specified location, wherein the enabling is executed after a specified time delay period, wherein the results of the second comparing indicates that the first value exceeds the predetermined frequency value by more than the second value, and wherein the load adjustment modification process comprises: determining, by the computing system, a desired load increase value associated with reducing the first value by a specified amount; determining by the computing system, a specified time period associated with achieving the desired load increase value; enabling for the specified time period, by the computing system based on the desired load increase value, a first power consumption device of the plurality of power consumption devices such that the first power consumption device consumes power from the input voltage signal; and third comparing, by the computing system, a first current load value on the input voltage signal to the desired load increase value; generating, by the computing system a report associated with the load adjustment modification process; and storing, by the computing system, the report.

The present invention provides a modification method comprising: detecting, by a computing system, a frequency signal associated with an input voltage signal used for powering a plurality of power consumption devices at a specified location; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; enabling, by the computing system based on results of the second comparing, a load adjustment modification process associated with the plurality of power consumption devices at the specified location, wherein the enabling is executed after a specified time delay period, wherein the results of the second comparing indicates that the first value is less than the predetermined value by more than the second value, and wherein the load adjustment modification process comprises: determining, by the computing system, a desired load decrease value associated with increasing the first value by a specified amount; determining by the computing system, a specified time period associated with achieving the desired load decrease value; disabling for the specified time period, by the computing system based on the desired load decrease value, a first enabled power consumption device of the plurality of power consumption devices such that the first enabled power consumption device becomes disabled from consuming power from the input voltage signal; and third comparing, by the computing system, a first current load value on the input voltage signal to the desired load decrease value; generating, by the computing system a report associated with the load adjustment modification process; and storing, by the computing system, the report.

The present invention provides a computing system comprising a processor coupled to a computer-readable memory unit, said memory unit comprising instructions that when executed by the processor implements a modification method, said method comprising: detecting, by said computing system, a frequency signal associated with an input voltage signal used for powering a plurality of power consumption devices at a specified location; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; enabling, by the computing system based on results of the second comparing, a load adjustment modification process associated with the plurality of power consumption devices at the specified location, wherein the enabling is executed after a specified time delay period, wherein the results of the second comparing indicates that the first value exceeds the predetermined frequency value by more than the second value, and wherein the load adjustment modification process comprises: determining, by the computing system, a desired load increase value associated with reducing the first value by a specified amount; determining by the computing system, a specified time period associated with achieving the desired load increase value; enabling for the specified time period, by the computing system based on the desired load increase value, a first power consumption device of the plurality of power consumption devices such that the first power consumption device consumes power from the input voltage signal; and third comparing, by the computing system, a first current load value on the input voltage signal to the desired load increase value; generating, by the computing system a report associated with the load adjustment modification process; and storing, by the computing system, the report.

The present invention provides a comprising a processor coupled to a computer-readable memory unit, the memory unit comprising instructions that when executed by the processor implements a modification method, the method comprising: detecting, by the computing system, a frequency signal associated with an input voltage signal used for powering a plurality of power consumption devices at a specified location; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; enabling, by the computing system based on results of the second comparing, a load adjustment modification process associated with the plurality of power consumption devices at the specified location, wherein the enabling is executed after a specified time delay period, wherein the results of the second comparing indicates that the first value is less than the predetermined frequency value by more than the second value, and wherein the load adjustment modification process comprises: determining, by the computing system, a desired load decrease value associated with increasing the first value by a specified amount; determining by the computing system, a specified time period associated with achieving the desired load decrease value; disabling for the specified time period, by the computing system based on the desired load decrease value, a first enabled power consumption device of the plurality of power consumption devices such that the first enabled power consumption device becomes disabled from consuming power from the input voltage signal; and third comparing, by the computing system, a first current load value on the input voltage signal to the desired load decrease value; generating, by the computing system a report associated with the load adjustment modification process; and storing, by the computing system, the report.

The present invention advantageously provides a simple method and associated system capable of monitoring and modifying power systems.

DETAILED DESCRIPTION

Figure 1:
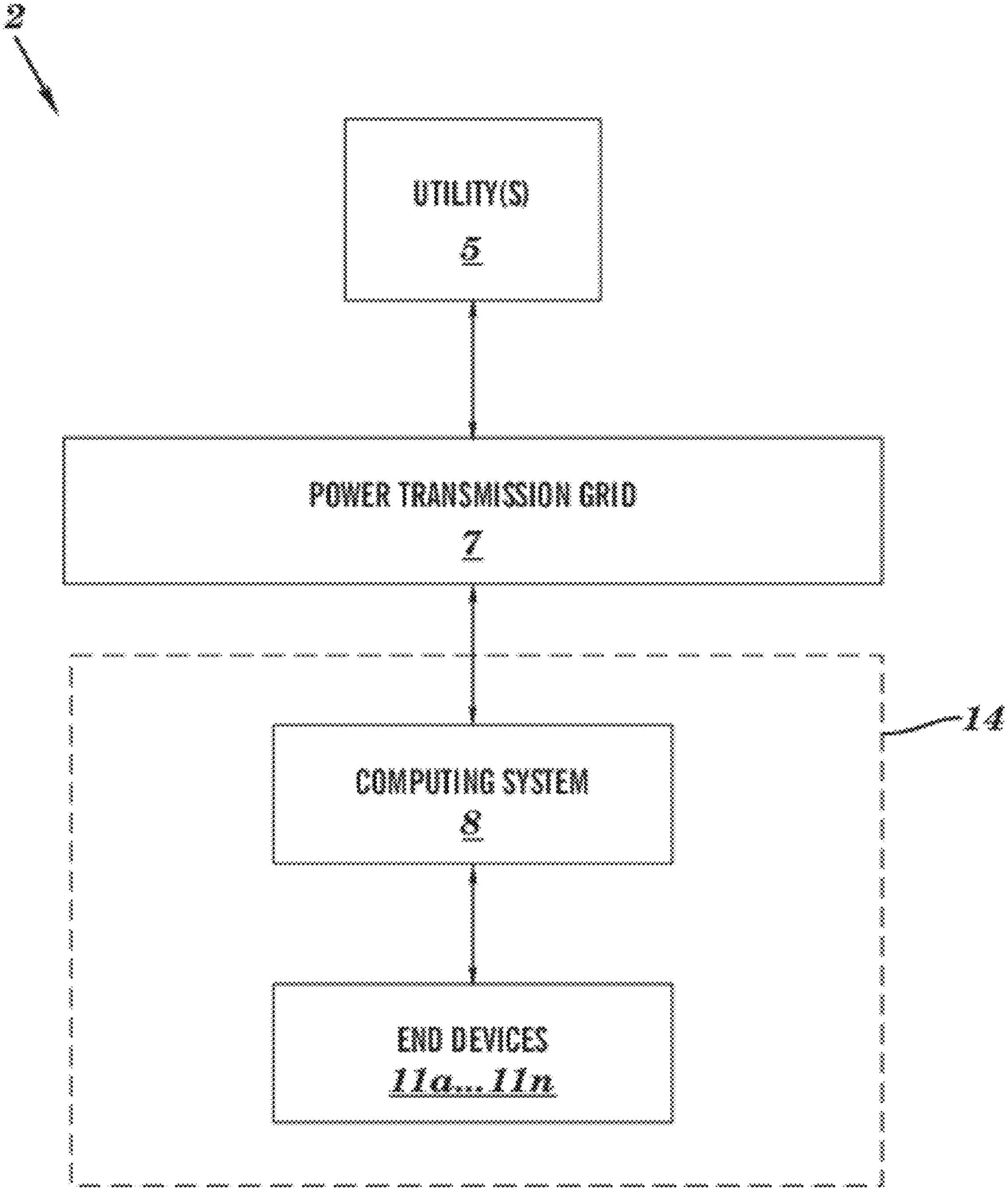
FIG. 1 illustrates a system for monitoring a frequency signal associated with a supply voltage retrieved from a power grid and performing a load adjustment modification process based on a value of the frequency signal, in accordance with embodiments of the present invention.

FIG. 1 illustrates a system 2 for monitoring a frequency signal associated with a supply voltage retrieved from a power grid and performing a load adjustment modification process based on a value of the frequency signal, in accordance with embodiments of the present invention. Load fluctuations associated with power usage by electrical devices (e.g., appliances such as a furnace turning on or off) may cause the frequency signal (e.g., 60 Hertz (Hz)) associated with a supply voltage retrieved from a power grid (e.g., power transmission grid 7) to fluctuate (e.g., rise or fall). Therefore, system 2 is enabled to monitor the frequency signal and perform a load adjustment modification process (e.g., automatically increasing or decreasing a thermostat setting for a furnace) based on a monitored value of the frequency signal.

System 2 comprises a computing system 8 connected to a utility(s) 5 through a power transmission grid 7. Computing system 8 is additionally connected to end devices 11*a* . . . 11*n*. Computing system 8 and end devices 11*a* . . . 11*n* are located within a specified location 14. Specified location 14 may comprise a house and surrounding property, a building (associated with a business) and surrounding property, etc. End devices 11*a* . . . 11*n* may comprise any type of electrical device that consumes electrical power (e.g., household appliances, a furnace, an oven an air conditioner, a computer, a hot water tank, an electric heater, etc) provided by utility(s) 5. Electrical power may be retrieved via a power grid (e.g., power transmission grid 7). Utility 5 may comprise any type of electrical power supplier that produces and/or distributes electrical power. Utilities 5*a* . . . 5*n* may produce and/or distribute any type of electrical power including, inter alia, fossil fuel generated power, steam generated power, hydro generated power, solar generated power, wind generated power, fuel cell generated power, etc. Computing system 8 may comprise a memory system. The memory system may comprise a single memory system. Alternatively, the memory system may comprise a plurality of memory systems. The memory system may be internal to computing system 8 or external to computing system 8. Computing system 8 may comprise a software application for controlling functionality. Computing system 8 comprises a system for monitoring a power grid (e.g., associated with power generated by utility(s) 5) frequency (e.g., 60 Hertz (Hz)) and adjusting a load associated with end devices 11*a* . . . 11*n* based on a value of the monitored frequency. Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc). System 2 performs the following process:

When a frequency drop is detected and a load (i.e., associated with a power consumption of end devices 11*a* . . . 11*n*) must be decreased, end devices (e.g., end devices 11*a* . . .11*n*) may be turned off or down. Conversely, when a frequency increase is detected, end devices (e.g., end devices 11*a* . . . 11*n*) may be turned on or up. System 2 enables a function by which the further the frequency deviates from a 60 Hz nominal value, the more and potentially faster system 2 responds. For example, if the frequency falls to 59.5 Hz, a temperature offset for a furnace would be greater and a response of the controlled end devices 11*a* . . . 11*n* is faster than if the frequency fell to only 59.8 Hz. System does not require two-way communications between power user and power provider. Although the following description is described with respect to performing adjustments to a thermostat (for controlling a furnace or air conditioner unit), note that system 2 may perform adjustments to any power-consuming device on the power grid (e.g., power transmission grid 7). System 2 uses electric grid frequency for providing an offset value to temperature controlled devices such that during periods of high load and low generation, a target temperature is automatically set without any interaction from centralized servers. System 2 automatically adjusts a thermostat such that less power is consumed by the temperature controlled devices and during periods of low load and high power generation, a target temperature is automatically adjusted to consume more power. Table 1 illustrates actions taken when changes are detected in the frequency of the power grid (e.g., power transmission grid 7). These actions help to restore a power supply/demand balance.

TABLE 1

| Frequency Change Detected | Indicates | Action | Change to End Devices |
|---|---|---|---|
| Frequency Less Than 60 Hz | Demand to High for Supply Voltage | Decrease Load | Decrease Thermostat Temperature and/or Disable End Devices |
| Frequency Greater Than 60 Hz | Demand to Low for Supply Voltage | Increase Load | Increase Thermostat Temperature and/or Enable End Devices |

Large load or generation transients result in rapid changes in a power system frequency (e.g., frequency associated with Utility(s) 5), which is immediately detectable throughout a power grid interconnect. For example, the loss of a significant power generating capacity (supply) results in a power system voltage and power system frequency falling below nominal values. Likewise, a loss of a significant load (demand), such as a transmission line to an urban area tripping due to accident, lighting strike, or failure of a power substation, results in a power system voltage and frequency rising above a nominal value. The coupling of a power system frequency and voltage is a result of rotating masses which are used to generate a majority of power. As a load increases, additional fuel must be provided to maintain the same power output. If additional fuel (e.g., in the form of steam or combustion) is not added, the rotation speed of the turbine or prime mover drops and the output frequency falls with it. As the load decreases, fuel must be reduced in the same manner.

System 2 may be used to automatically adjust a thermostat up or down in response to a monitored power system frequency. As the power system frequency drops, a temperature set-point (i.e., on the thermostat) is changed in a less-power-consuming direction such that end devices (e.g., end devices 11*a* . . . 11*n*) which are at a new set-point automatically drop from the grid (e.g., power transmission grid 7) with no interaction from a customer or utility(s) 5. If the power system frequency rises, the set-point is moved in a more-power-consuming direction such that end devices which were on the verge of turning on, then turn on in response to the excess system generation condition and restore the grid interconnection balance between load and generation. In extreme cases (e.g., a loss of a large portion of power generating capacity) the power system frequency falls outside the 60.000+/−0.035 Hz dead-band used for most power generating systems. This results in further degradation of the power system as generators trip off-line due to their inability to function outside the dead-band. An amount of time for a response is measured in cycles (1/60th of a second) as a destructive interference between grid power and generator output may result in equipment damage. With communication delays measuring in seconds to minutes, this time may not be sufficient to avert a catastrophe. Therefore, system 2 enables a function by which the further the system frequency deviates from the 60.000 Hz nominal value the more and potentially faster system 2 responds. For example, although a frequency drop to 59 Hz may not be harmful to motors in most air conditioning compressors, system 2 may request that an air conditioning system, hot water heater, electric heater, or other high demand thermostatically controlled device take a 5 minute rest break in the event the system frequency dropped below 59 Hz.

The following steps illustrate a load adjustment modification process performed by system 2 based on a value of a monitored frequency signal on the power grid (e.g., from utility(s) 5:

1. If the monitored power grid frequency is plus or minus a dead-band value for the nominal line frequency (e.g., 60 Hz in North America and the Caribbean, 50 Hz in Europe, parts of Africa, Asia, and Australia, etc), normal settings for any modified devices are resumed.
2. If the monitored power grid frequency is greater than the nominal frequency by more the dead-band amount, a system load is increased by modifying device settings (e.g., a temperature setting of a water heater, furnace, or air conditioning unit) such that the power requirements are increased (i.e., as described in detail, infra).
3. If the monitored power grid frequency is less than the nominal frequency by more than the dead-band amount, a system load is decreased by modifying device settings (e.g., a temperature setting of a water heater, furnace, or air conditioning unit) such that the power requirements are decreased (i.e., as described in detail, infra).
4. System 2 delays for a specified time period and step 1 is repeated.

The following steps detail step 2 (i.e., increase system load) of the above described steps as follows:

A. Computing system 8 compares current device settings (e.g., a temperature of an end device) against a maximum power consumption permitted setting. As a first example, for an end device which produces heat (e.g., a furnace, water heater, clothes dryer, etc) this would be a maximum permitted temperature. As a second example, for an end device which removes heat (e.g., a refrigeration unit, an air conditioner, etc) this would be a minimum permitted temperature.

B. If the current device setting (e.g., temporary or permanent) is at the maximum power consumption permitted value, the current device is bypassed.

C. If a most recent change in power consumption for the current device is more recent than a configurable value, the current device is bypassed.

D. Computing system 8 computes a difference between the current grid frequency and the target grid frequency. Computing system 8 computes a change in device settings using a function such that the change in device settings increases a power consumption in a proportional fashion (e.g., linearly, using a higher order/quadratic equation, etc) relative to the difference between the nominal and actual line frequencies.

The following steps detail step 3 (i.e., decrease system load) of the above described steps as follows:

A. Computing system 8 compares current device settings (e.g., a temperature of an end device) against a minimum power consumption permitted setting. As a first example, for an end device which produces heat (e.g., a furnace, water heater, clothes dryer, etc) this would be a minimum permitted temperature. As a second example, for an end device which removes heat (e.g., a refrigeration unit, an air conditioner, etc) this would be a maximum permitted temperature.

B. If the current device setting (e.g., temporary or permanent) is at the minimum power consumption permitted value, the current device is bypassed.

C. If a most recent change in power consumption for the current device is more recent than a configurable value, the current device is bypassed.

D. Computing system 8 computes a difference between the current grid frequency and the target grid frequency. Computing system 8 computes a change in device settings using a function such that the change in device settings decreases a power consumption in a proportional fashion (e.g., linearly, using a higher order/quadratic equation, etc) relative to the difference between the nominal and actual line frequencies.

Figure 2:
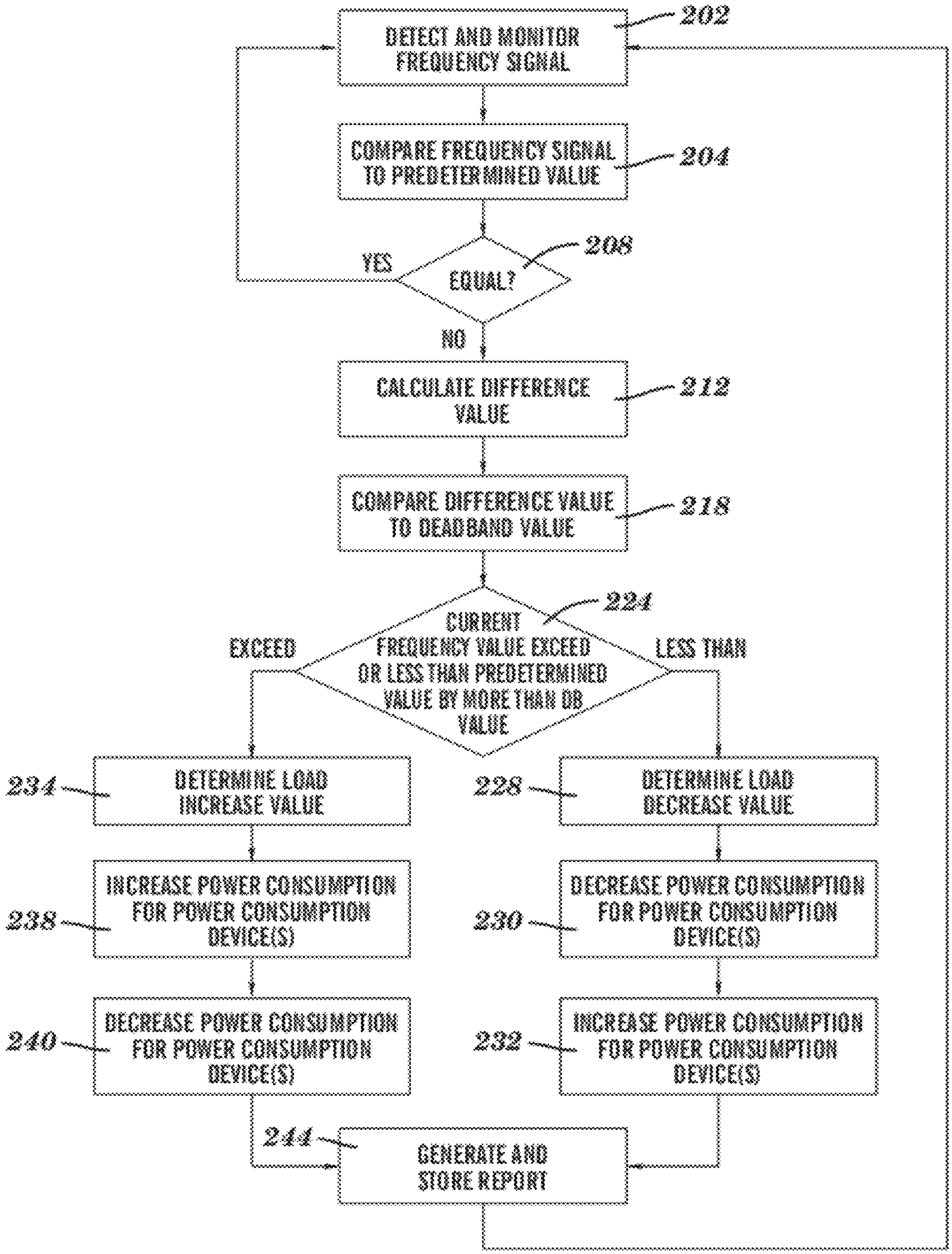
FIG. 2 illustrates a flowchart describing an algorithm used by the system of FIG. 1 for monitoring a frequency signal associated with a supply voltage retrieved from a power grid and performing a load adjustment modification process based on a value of the frequency signal, in accordance with embodiments of the present invention.

FIG. 2 illustrates a flowchart describing an algorithm used by system 2 of FIG. 1 for monitoring a frequency signal associated with a supply voltage retrieved from a power grid (e.g., power transmission grid 7 in FIG. 1) and performing a load adjustment modification process based on a value of the frequency signal, in accordance with embodiments of the present invention. In step 202, a computing system (e.g., computing system 8 of FIG. 1) detects and monitors a frequency signal associated with an input voltage signal (i.e., from a utility (e.g., utility(s) 5 of FIG. 1) via a power grid) used for powering a plurality of power consumption devices (e.g., end devices 11*a* . . . 11*n* of FIG. 1) at a specified location (e.g., specified location 14 of FIG. 1). In step 204, the computing system compares the frequency signal to a predetermined frequency value (i.e., the expected frequency value). For example, the predetermined frequency value may comprise, inter alia, 60 Hz, 50 Hz, etc. In step 208, the computing system determines (i.e., based on results generated in step 204) if the frequency signal comprises a current frequency value is equal to the predetermined frequency value. If in step 208, it is determined that the frequency signal comprises a current frequency value equal to the predetermined frequency value then step 202 is repeated. If in step 208, it is determined that the frequency signal comprises a current frequency value that is not equal to the predetermined frequency value then in step 212, the computing system calculates a difference value between the current frequency value and the predetermined frequency value. In step 218, the computing system compares the difference value to a dead-band value. The dead-band value comprises an acceptable offset (i.e., for the current frequency value) from the predetermined frequency value. In step 224, (i.e., based on results from step 218), if the current frequency value exceeds or is less than the predetermined frequency value by more than the dead-band value.

If in step 224, it is determined that the current frequency value exceeds the predetermined frequency value by more than the dead-band value then in step 234, the computing system determines a desired load increase value associated with reducing the current frequency value by a specified amount. In step 238, the computing system increases (i.e., based on the desired load increase value, determined in step 234) a power usage of an enabled power consumption device (s) of the plurality of power consumption devices and a first current load value on the supply voltage signal is compared to the desired load increase value. If the first current load value exceeds the desired load increase value then in step 240, the computing system may decrease a power usage of an enabled power consumption device(s) of the plurality of power consumption devices. When the desired load increase value is equal to the first current load value then a report indicating all changes is generated and stored by computing system in step 244 and the process is repeated (i.e., at step 202).

If in step 224, it is determined that the current frequency value is less than the predetermined frequency value by more than the dead-band value then in step 228, the computing system determines a desired load decrease value associated with increasing the current frequency value by a specified amount. In step 230, the computing system decreases (i.e., based on the desired load decrease value, determined in step 228) a power usage of an enabled power consumption device (s) of the plurality of power consumption devices and a first current load value on the supply voltage signal is compared to the desired load decrease value. If the first current load value is less than the desired load increase value then in step 232, the computing system may increase a power usage of an enabled power consumption device(s) of the plurality of power consumption devices. When the desired load decrease value is equal to the first current load value then a report indicating all changes is generated and stored by computing system in step 244 and the process is repeated (i.e., at step 202).

Figure 3:
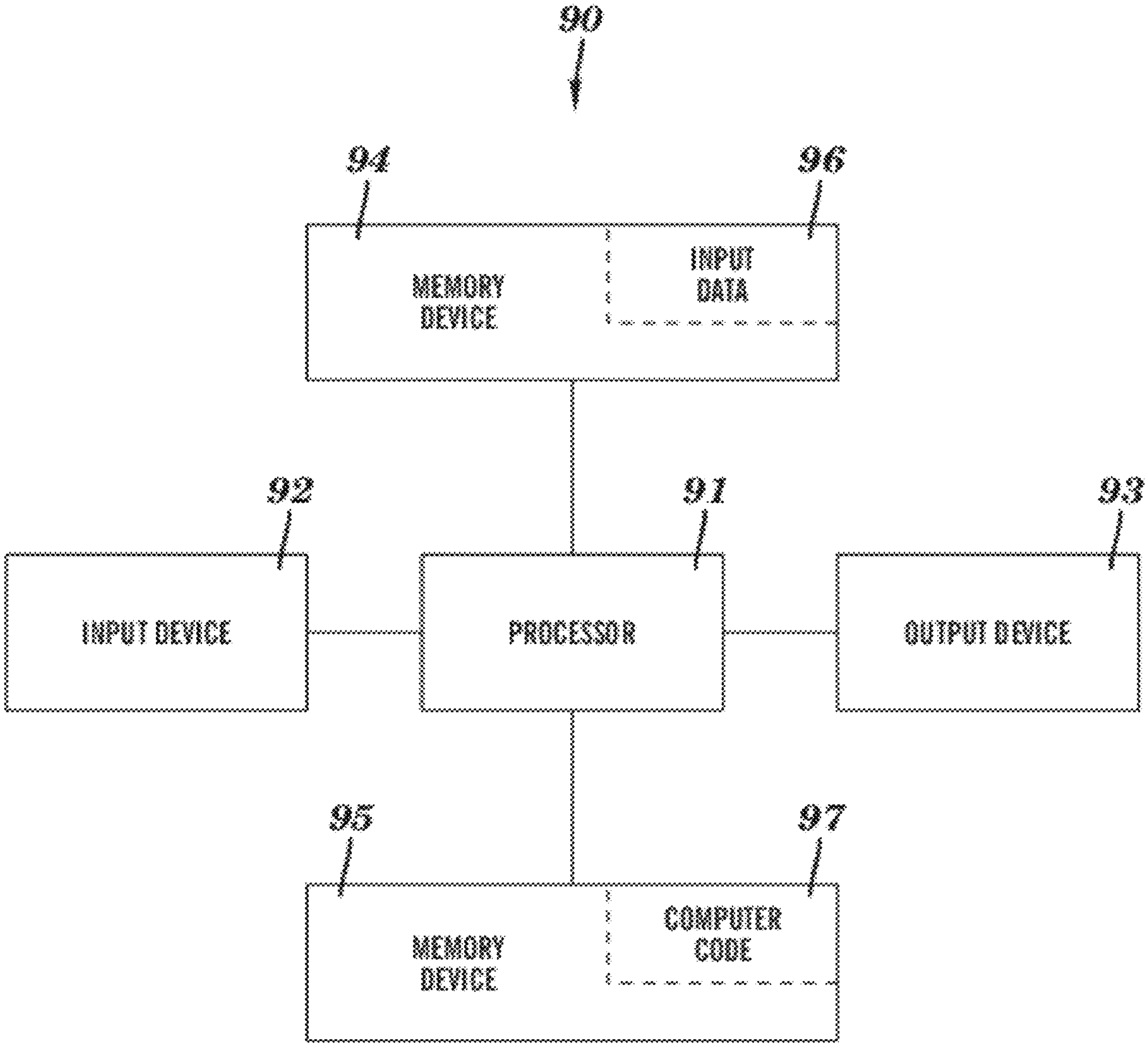
FIG. 3 illustrates a computer apparatus used for monitoring a frequency signal associated with a supply voltage retrieved from a power grid and performing a load adjustment modification process based on a value of the frequency signal, in accordance with embodiments of the present invention.

FIG. 3 illustrates a computer apparatus 90 (e.g., computing system 8 of FIG. 1) used for monitoring a frequency signal associated with a supply voltage retrieved from a power grid and performing a load adjustment modification process based on a value of the frequency signal, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for monitoring a frequency signal associated with a supply voltage retrieved from a power grid and performing a load adjustment modification process based on a value of the frequency signal. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithms of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to for monitor a frequency signal associated with a supply voltage retrieved from a power grid and perform a load adjustment modification process based on a value of the frequency signal. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring a frequency signal associated with a supply voltage retrieved from a power grid and performing a load adjustment modification process based on a value of the frequency signal. In another embodiment, the invention provides a business method that performs the process steps of the invention on a subscription, advertising, and/or fee basis. That is, a service supplier, such as a Solution Integrator, could offer to monitor a frequency signal associated with a supply voltage retrieved from a power grid and perform a load adjustment modification process based on a value of the frequency signal. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A modification method comprising:

detecting, by a computing system, a frequency signal associated with an input voltage signal used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system based on results of said second comparing, a load adjustment modification process associated with said plurality of power consumption devices at said specified location, wherein said enabling is executed after a specified time delay period, wherein said results of said second comparing indicates that said first value exceeds said predetermined frequency value by more than said second value, and wherein said load adjustment modification process comprises:

determining, by said computing system, a desired load increase value associated with reducing said first value by a specified amount;

determining by said computing system, a specified time period associated with achieving said desired load increase value;

enabling for said specified time period, by said computing system based on said desired load increase value, a first power consumption device of said plurality of power consumption devices such that said first power consumption device consumes power from said input voltage signal; and third comparing, by said computing system, a first current load value on said input voltage signal to said desired load increase value;

generating, by said computing system a report associated with said load adjustment modification process; and storing, by said computing system, said report.

2. The method of claim 1, wherein said load adjustment modification process further comprises:

determining, by said computing system based on results of said third comparing, that said first current load value is less than said desired load increase value; and increasing, by said computing system, a power usage of a second enabled power consumption device of said plurality of power consumption devices.

3. The method of claim 2, wherein said load adjustment modification process further comprises:

fourth comparing, by said computing system, a second current load value on said input voltage signal to said desired load increase value;

determining, by said computing system based on results of said fourth comparing, that said second current load value is greater than said desired load increase value; and decreasing, by said computing system, a power usage of a third enabled power consumption device of said plurality of power consumption devices.

4. The method of claim 1, wherein said first enabled power consumption device is selected from a list of enabled power consumption devices.

5. A modification method comprising:

detecting, by a computing system, a frequency signal associated with an input voltage signal used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system based on results of said second comparing, a load adjustment modification process associated with said plurality of power consumption devices at said specified location, wherein said enabling is executed after a specified time delay period, wherein said results of said second comparing indicates that said first value is less than said predetermined value by more than said second value, and wherein said load adjustment modification process comprises:

determining, by said computing system, a desired load decrease value associated with increasing said first value by a specified amount;

determining by said computing system, a specified time period associated with achieving said desired load decrease value;

disabling for said specified time period, by said computing system based on said desired load decrease value, a first enabled power consumption device of said plurality of power consumption devices such that said first enabled power consumption device becomes disabled from consuming power from said input voltage signal; and third comparing, by said computing system, a first current load value on said input voltage signal to said desired load decrease value;

generating, by said computing system a report associated with said load adjustment modification process; and storing, by said computing system, said report.

6. The method of claim 5, wherein said load adjustment modification process further comprises:

determining, by said computing system based on results of said third comparing, that said first current load value is greater than said desired load decrease value; and decreasing, by said computing system, a power usage of a second enabled power consumption device of said plurality of power consumption devices.

7. The method of claim 6, wherein said load adjustment modification process further comprises:

fourth comparing, by said computing system, a second current load value on said input voltage signal to said desired load decrease value;

determining, by said computing system based on results of said fourth comparing, that said second current load value is less than said desired load decrease value; and increasing, by said computing system, a power usage of a third enabled power consumption device of said plurality of power consumption devices.

8. The method of claim 5, wherein said first enabled power consumption device is selected from a list of enabled power consumption devices.

9. A computer program product, comprising a computer storage medium comprising a computer readable program code embodied therein, said computer readable program code configured to perform the method of claim 1 upon being executed by a processor of said computing system.

10. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

11. A computing system comprising a processor coupled to a computer-readable memory unit, said memory unit comprising instructions that when executed by the processor implements a modification method, said method comprising:

detecting, by said computing system, a frequency signal associated with an input voltage signal used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system based on results of said second comparing, a load adjustment modification process associated with said plurality of power consumption devices at said specified location, wherein said enabling is executed after a specified time delay period, wherein said results of said second comparing indicates that said first value exceeds said predetermined frequency value by more than said second value, and wherein said load adjustment modification process comprises:

determining, by said computing system, a desired load increase value associated with reducing said first value by a specified amount;

determining by said computing system, a specified time period associated with achieving said desired load increase value;

enabling for said specified time period, by said computing system based on said desired load increase value, a first power consumption device of said plurality of power consumption devices such that said first power consumption device consumes power from said input voltage signal; and third comparing, by said computing system, a first current load value on said input voltage signal to said desired load increase value;

generating, by said computing system a report associated with said load adjustment modification process; and storing, by said computing system, said report.

12. The computing system of claim 11, wherein said load adjustment modification process further comprises:

determining, by said computing system based on results of said third comparing, that said first current load value is less than said desired load increase value; and increasing, by said computing system, a power usage of a second enabled power consumption device of said plurality of power consumption devices.

13. The computing system of claim 12, wherein said load adjustment modification process further comprises:

fourth comparing, by said computing system, a second current load value on said input voltage signal to said desired load increase value;

determining, by said computing system based on results of said fourth comparing, that said second current load value is greater than said desired load increase value; and decreasing, by said computing system, a power usage of a third enabled power consumption device of said plurality of power consumption devices.

14. The computing system of claim 11, wherein said first enabled power consumption device is selected from a list of enabled power consumption devices.

15. A computing system comprising a processor coupled to a computer-readable memory unit, said memory unit comprising instructions that when executed by the processor implements a modification method, said method comprising:

detecting, by said computing system, a frequency signal associated with an input voltage signal used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system based on results of said second comparing, a load adjustment modification process associated with said plurality of power consumption devices at said specified location, wherein said enabling is executed after a specified time delay period, wherein said results of said second comparing indicates that said first value is less than said predetermined frequency value by more than said second value, and wherein said load adjustment modification process comprises:

determining, by said computing system, a desired load decrease value associated with increasing said first value by a specified amount;

determining by said computing system, a specified time period associated with achieving said desired load decrease value;

disabling for said specified time period, by said computing system based on said desired load decrease value, a first enabled power consumption device of said plurality of power consumption devices such that said first enabled power consumption device becomes disabled from consuming power from said input voltage signal; and third comparing, by said computing system, a first current load value on said input voltage signal to said desired load decrease value;

generating, by said computing system a report associated with said load adjustment modification process; and storing, by said computing system, said report.

16. The computing system of claim 15, wherein said load adjustment modification process further comprises:

determining, by said computing system based on results of said third comparing, that said first current load value is greater than said desired load decrease value; and decreasing, by said computing system, a power usage of a second enabled power consumption device of said plurality of power consumption devices.

17. The computing system of claim 16, wherein said load adjustment modification process further comprises:

fourth comparing, by said computing system, a second current load value on said input voltage signal to said desired load decrease value;

determining, by said computing system based on results of said fourth comparing, that said second current load value is less than said desired load decrease value; and increasing, by said computing system, a power usage of a third enabled power consumption device of said plurality of power consumption devices.

* * * * *